Oct. 17, 1939.　　F. ROGERS ET AL　　2,176,472

WHEELED VEHICLE

Filed July 6, 1938

INVENTORS
Frank Rogers
BY Joseph Robinson their ATTORNEY

Patented Oct. 17, 1939

2,176,472

UNITED STATES PATENT OFFICE 2,176,472

WHEELED VEHICLE

Frank Rogers and Joseph Robinson, New York, N. Y.

Application July 6, 1938, Serial No. 217,707

3 Claims. (Cl. 188—20)

This invention relates to wheeled vehicles.

The invention has been made with the idea of providing a novel and improved braking means for a baby-carriage of the coach or go-cart type. However, the invention may be of utility with any vehicle having a U-shaped propelling and steering gear at one end, as a hand-truck, a peddler's cart, or the like. Therefore, while a baby-carriage will be hereinafter referred to, that term is to be taken as inclusive of a wheeled vehicle of any kind having the essentials of the invention as set forth in the claims.

The invention is exemplifyingly illustrated in the accompanying drawing, in connection with a so-called perambulator or coach-type of baby-carriage.

A feature of the invention is a single actuator for a braking couple for holding the latter or allowing the same to be held to braking condition, but which when moved in either one of two opposite directions on the vehicle, sets the braking couple to brake-release condition; with this actuator the customary horizontal handle set spanningly across the top of the usual handle-gear of inverted U-shape extended in an upward and rearward direction from the chassis of the carriage.

This actuator could, as will be understood, serve a braking means for one, two or more of the four wheels of the vehicle. In the illustrated embodiment aforesaid, a construction is shown in which each of the two wheels at the opposite ends of one of the two axles of a baby-carriage simultaneously are subjected to braking or given brake release according to the invention.

According to the invention, the objects are attained of having the handle-gear itself of perfectly conventional appearance, and of having the same rigidly and particularly non-rockingly secured to the chassis, while nevertheless providing an operative combination including a part of said handle-gear such that, with the same including a means for yieldingly holding the braking means to ineffective condition, and which yielding means automatically thus acts when the vehicle comes to rest, there is operatively associated with the two means just mentioned a single instrumentality for throwing the braking means to ineffective condition the instant the vehicle is given a propelling impulse in either a forward or reverse direction. This instrumentality constitutes one of the two commonly relatively movable parts of carrier of an ordinary baby-carriage, whereby the familiar handle-gear of a baby-carriage, to wit, the common main frame of such gear, and the time-honored handle across the top thereof, but with the latter interfitted with said frame in a novel way.

Various other objects and advantages of the invention will be referred to or become apparent, and the invention itself will be clearly understood, during the following detailed description of the aforesaid embodiment as illustratively shown in the accompanying drawing.

In said drawing.

Similar reference characters refer to similar parts throughout the several views of the drawing.

Figure 1:
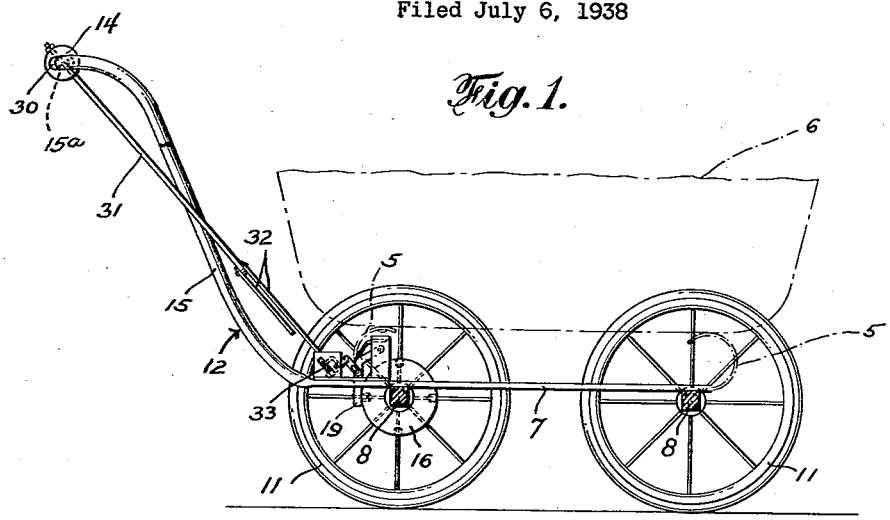
Fig. 1 is a view partially in side elevation and partially in section of a baby-carriage equipped according to the invention; this view, as to the parts shown in section, being a vertical section taken substantially on the line 1—1 of Fig. 2.
Figure 2:
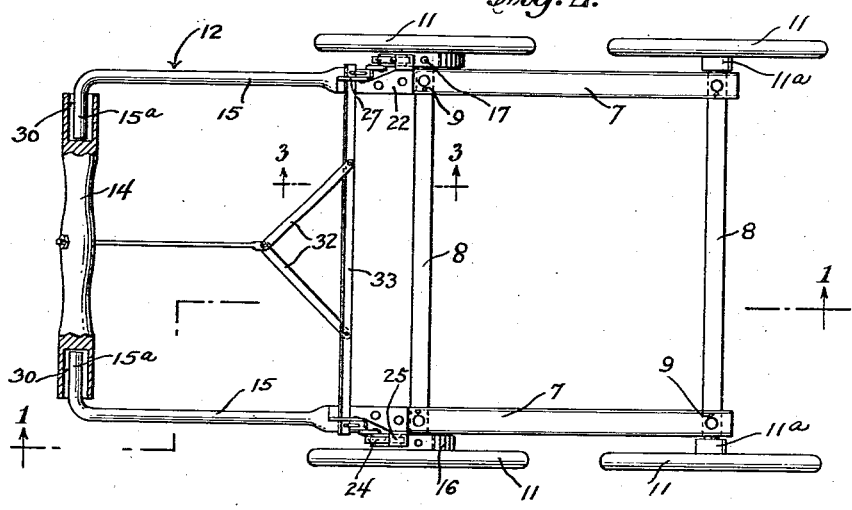
Fig. 2 is a top plan view of said baby-carriage, with the body thereof, and the springs by which such body is mounted on the running gear omitted, these last parts shown in dot-and-dash lines in Fig. 1.

Referring now in detail to the exemplifying embodiment thus illustrated in the drawing, the chassis of the baby-carriage, and on which by means of the usual springs indicated at 5 a suitable body 6 is mounted, includes as shown a pair of side-bars 7 crossed at the front and rear ends of the chassis by square axle-rods 8 secured to said bars in a conventional manner as indicated at 9, thereby to establish a rigid horizontal quadrilateral frame as shown in Fig. 2. Ordinarily, and as here illustrated, these axle-rods are lathe-turned at opposite ends to provide terminal cylindrical portions (indicated in broken lines at 10 in Fig. 3), on which the wheels 11 are freely revoluble.

The usual handle-carrying U-shaped frame for manually propelling and steering the baby-carriage is shown as present, the same being indicated generally by the reference character 12. This U-shaped frame, also in accord with the customary practice, is shown as having the bottom of its inverted U, that is, its own top, spanned by a wooden handle 14, and as having the legs 15 of the U formed of round-rod stock integral with the side-bars 7 flattened from said stock.

As shown in Fig. 2, in regard to the two front wheels 11 at the right in that view, these wheels are provided with the usual hollow hubs 11a inwardly directed toward the chassis. The two front wheels of the vehicle, it will be noted, are shown as conveniently of usual construction; but in the present case, since here both the two rear wheels, but these two wheels only, are illustrated as associated with the braking means of the present invention, these latter wheels have additions which, in the illustrated case, constitute the female members of a pair of simultaneously operable braking couples of the single-pin and multiple-recess type.

With the exception last-noted, the baby-carriage shown is as above described of conventional construction.

Referring now to each of the two braking couples last-referred to, the female member thereof, indicated at 16, is shown as a circular disk having a central hole for taking the hub (like one of the hubs 11a shown at the right in Fig. 2) of the associated wheel. The disk 16 is suitably fixed on the hub of the associated wheel, as by a set-screw not shown. Around its periphery the disk has a plurality of acentrically radially extending recesses 17, in the present case shown as four in number and spaced apart 90 degrees.

The cooperant male clutch member for the disk 16 is a pin 18 on a substantially L-shaped lever 19 pivoted at 20 on an ear 21 upstanding from a metal stamping 22 atop the adjacent side-bar 7 of the chassis and riveted thereto as at 23.

A means for yieldingly urging the braking means made up of the male and female clutch members just described, to brake setting position, is shown as comprising a leaf-spring 24, suitably secured in any desired way, as by welding, and at its upper end, to the underside of an offset lip 25 at the top of ear 21. The lower portion of this spring bears resiliently against the convexity of the elbowed portion of the lever 19.

Figure 3:
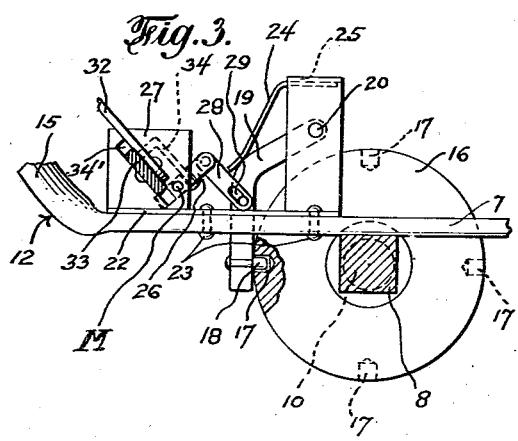
Fig. 3 is an enlarged detail view of a braking couple, a single actuator therefor, and a single instrumentality for operating said actuator as aforesaid, as well as certain other elements associated with these parts; this view showing such assemblage as seen in Fig. 1.

A single actuator for swinging the lever 19 in a counter-clockwise direction as seen in Fig. 3, thereby to release the brake, is here shown as embodied to include a lever 26 fulcrumed intermediate its ends on a second ear 27 upstanding from the stamping 22. In the present way of carrying out the invention such fulcruming of the lever 26, that is, intermediate its ends, is important; and to emphasize this, the point of fulcrum is indicated in Fig. 3 by the reference character M.

Why such or an equivalent arrangement is important in an embodiment of the invention of the type illustrated in the drawing will be clearly understood in a moment.

The lever 26 is operatively connected to the lever 19 by a link 28 joining these two levers as shown best in Fig. 3, and attached to the lever 19 by a pin-and-slot connection 29.

A means is provided for always operating the lever 26 in the same way about its fulcrum M, thereby through the link 28 to move the lever 19 to brake-releasing position, whether the lever 26 is pushed or pulled by way of an operative connection between said lever 26 and the handle 14. This means includes a single instrumentality constituting one of a plurality of relatively movable parts of a structure extended from the vehicle for allowing the latter to be propelled either by pushing or pulling. Said structure here is the usual baby-carriage U-frame handle-gear 12, and said instrumentality is according to the invention the usual handle 14 (so far as its appearance is concerned) sleeved along the top horizontal stretch of the inverted U formed by said handle-gear with the instrumentality so functioning that on relative movement between the relatively movable parts just above referred to the lever 26 acts to release the brake whether this relative movement is in one direction or the other on the vehicle according as said extension is pushed or pulled.

The handle 14, as to its usual aligned recesses in its opposite ends, for reception of the cylindrical offset horns 15a at the tops of the legs 15 of the handle-gear of the baby-carriage, has these aligned, not cylindrical as usual, but recesses of slot-shaped cross-section, as indicated at 30. The handle 14, by means to be described in a moment, and including the spring 24, is normally urged to maintain a position on these horns as shown in Fig. 2; automatically shifting in a rearward direction on the horns 15a at the initiation of a backward pull on the vehicle, and automatically shifting in a forward direction on the horns 15a at the initiation of a forward push on the vehicle. Either such shift is transmitted to the lever 26, by an operative connection to said lever, including a rod 31 secured at its upper end as indicated to the handle 14 and connected at its lower end to the meeting upper ends of a pair of downwardly diverging links 32 connected at their spread lower ends to an operating bar 33 extended across the chassis and near opposite ends guided in a pair of aligned inclined slots 34' in the ears 27 of the stampings 22, such slots longer than the width of said bar 33.

Figure 4:
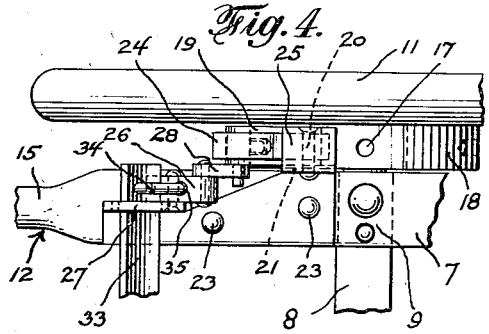
Fig. 4 is a top plan view of the parts of Fig. 3, including a showing of the associated vehicle wheel.

Recalling at this point that the lever 26 is fulcrumed at M intermediate its ends, note that the operating bar 33 is so placed that if pushed down in Fig. 3 it thrusts against the lever 26 at one side of its fulcrum M, while an L-shaped member 34 from the bar 33 is so placed that if said bar is pulled up in Fig. 3 said bar pulls against the lever 26 but at the opposite side of its fulcrum M. The shorter limb of the member 34 is fixed in any suitable way to the bar 33, and the longer depending limb thereof extends loosely through a hole marked 35 in Fig. 4, in the lever 26, and is capped as shown best in Fig. 3 below the bottom of such hole. This arrangement allows the member 34 to act as the direct puller on the lever 26 when the handle 14 is first pulled while the baby-carriage is at rest and the brakes are on, but renders the member 34 idle and hence non-interferent when the operating bar 33 acts as the direct pusher on the lever 26 when the handle 14 is first pushed while the baby-carriage is at rest and the brakes are on.

Such a pull or push, whichever it be in first starting propulsion of the vehicle, acts from the lever 26, through the link 28, to swing the lever 19 to brake release position. This condition is maintained all the while the vehicle is being pushed or pulled by way of the handle 14.

However, as soon as the vehicle is brought to stoppage, and the handle 14 manually released, the spring 24 comes into action and is free to urge the pin 18 of each braking couple into one of the recesses 17 of the disk 16. If the pin does not immediately engage one of these recesses, it will automatically do so as soon as the vehicle thereafter accidentally rolls at most a distance corresponding, in the structure illustrated, to one quarter a wheel circumference.

Variations and modifications are possible within the scope of the invention, and parts of the improvements can be used without others.

We claim:

1. An automatic brake-releasing mechanism for a baby-carriage of the kind having a wheel equipment carried by its chassis provided with braking means and yielding means for normally urging said braking means to braking condition, comprising a handle-gear of the conventional inverted-U shape incorporating upwardly and rearwardly rising side bars and a rod-like handle extended transverse to the carriage and between the upper ends of said side bars, said bars being connected rigidly to said chassis so as to have their upper ends always in fixed locations relative to the chassis; rod-like supporting means extended between said bars and carried by the latter at their topmost portions, said handle being hollowed out longitudinally and where thus hollowed out sleeving said rod-like supporting means, the hollowed out interior of the handle being of greater dimension in a horizontal direction than said rod-like supporting means in said direction; and means, including said yielding means and an operative connection between said handle and the braking means, for holding said rod-like supporting means substantially central in the hollowed out interior of the handle when the braking means is in braking condition, and for throwing said braking means to release condition on moving the handle relative to said rod-like supporting means, either in a forward direction, as in pushing the carriage, or in a rearward direction, as in pulling the carriage.

2. A mechanism as in claim 1, in which said rod-like supporting means includes two substantially cylindrical members directed toward each other and each inwardly integrally offset from the upper end of one of said side bars, and the handle has its hollowed out interior in the form of two recesses one at each end of the handle, each of said recesses being elongated from one end of the handle inwardly along substantially the center of the handle and being of slot-like cross-section, one recess being aligned with the other as to the direction of elongation of such slots.

3. A mechanism as in claim 1, in which said operative connection includes a pivoted member having its pivotal mounting secured to the chassis and having to be rocked in one direction to throw the braking means to release condition while overcoming said yielding means, a rod attached at its upper end to said handle, and means operatively connecting the lower end of said road and said pivoted member, the means last-mentioned functioning to rock said pivoted member always in said one direction on either a downward thrust or an upward pull of said rod, said rod being so extended that it is urged to downward thrust or upward pull, respectively, by movement of said handle relative to said rod-like supporting means resulting from a forward push or from a rearward pull on the carriage transmitted from said handle.

FRANK ROGERS.
JOSEPH ROBINSON.